(12) United States Patent
Elteto et al.

(10) Patent No.: US 8,117,221 B2
(45) Date of Patent: Feb. 14, 2012

(54) DATABASE OBFUSCATION SYSTEM AND METHOD

(75) Inventors: Laszlo Elteto, Irvine, CA (US); Henry W. Snyder, Mission Viejo, CA (US)

(73) Assignee: SafeNet, Inc., Belcamp, MD (US)

( * ) Notice: Subject to any disclaimer, the term of this patent is extended or adjusted under 35 U.S.C. 154(b) by 343 days.

(21) Appl. No.: 12/616,247

(22) Filed: Nov. 11, 2009

(65) Prior Publication Data

US 2010/0131518 A1 May 27, 2010

Related U.S. Application Data

(60) Provisional application No. 61/200,159, filed on Nov. 25, 2008.

(51) Int. Cl.
*G06F 17/30* (2006.01)

(52) U.S. Cl. .................................. 707/757; 707/809
(58) Field of Classification Search .................. 707/757, 707/809
See application file for complete search history.

(56) References Cited

U.S. PATENT DOCUMENTS

2009/0077388 A1* 3/2009 Suzuki .......................... 713/189
2011/0179011 A1* 7/2011 Cardno et al. ................. 707/709

* cited by examiner

*Primary Examiner* — James Trujillo
*Assistant Examiner* — Soheila Davanlou
(74) *Attorney, Agent, or Firm* — Drinker Biddle & Reath LLP

(57) ABSTRACT

A system and method for obfuscating a database's schema while preserving its functionality by modifying the original table names, column names, table order, column order, and/or data character set such that the standard order of the original characters is maintained.

28 Claims, 10 Drawing Sheets

510 — #ifdef _DEBUG
　　　　#define TABLE_NAME_LICENSE "License"
504 ⟨ :
　　　　#define COLUMN_NAME_VENDOR "Vendor"
515 — :
　　　　#else
　　　　#define TABLE_NAME_LICENSE "Trrrrrrrrr"
506 ⟨ :
　　　　#define COLUMN_NAME_VENDOR "Crrrrrrrrrr"
　　　　:
520 — #endif
　　　　typedef struct
　　　　{
　　　　　　int NumberOfColumns; /* array size */
　　　　　　char** ColumnNames; /* array of column names */
　　　　} ColumnStruct;
　　　　typedef struct
　　　　{
　　　　　　char* TableName; /* table name */
　　　　　　ColumnStruct* Columns; /* columns in this table */
　　　　} DbStruct;
　　　　static char* LicenseTableColumnNames[] = {COLUMN_NAME_VENDOR, ...};
　　　　#define NumOfLicenseTableColumns (sizeof(LicenseTableColumnNames) /
　　　　　　　sizeof(char*))
　　　　static ColumnStruct LicenseTableColumns = {NumOfLicenseTableColumns,
　　　　　　　NULL};
　　　　:
　　　　static DbStruct DbTables[] = {
　　　　　　{TABLE_NAME_LICENSE, NULL},
　　　　　　:
　　　　};
　　　　#define NumOfLicenseTables (sizeof(DbTables) / sizeof(DbStruct))

FIG. 5A

LicenseTableColumns.ColumnNames = LicenseTableColumnNames;
:
DbTables[0].Columns = &LicenseTableColumns;

FIG. 5B obfuscated table name = AES(data = original table name , key = R)
obfuscated table name = AES(data = R, key = original table name)
obfuscated table name = AES(data = original table name XOR R , key = fixed)
obfuscated table name = hash(original table name + R)
obfuscated table name = original table name XOR R obfuscated column name = AES(data = original column name , key = R)
obfuscated column name = AES(data = R, key = original column name)
obfuscated column name = AES(data = original column name XOR R , key = fixed)
obfuscated column name = hash(original column name + R)
obfuscated column name = hash(original column name + original table name + R)
obfuscated column name = original column name XOR R
obfuscated column name = original column name XOR original table name XOR R

FIG. 6

```
for (i = 0; i < NumOfLicenseTables; i++)
{
use DbTables[i] to generate CREATE TABLE
}
```

FIG. 7A

```
for (j = 0; j < DbTables[i].Columns->NumberOfColumns; j++)
```

FIG. 7B

```
for (i = 0; i < NumOfLicenseTables; i++)
{
use DbTables[TablePermute[i]] to generate CREATE TABLE
}
```

FIG. 7C

800 — generate a random R;

810 — derive the obfuscated table and column names from R and the original names (except for one table);

820 — create a random permutation array of the table indexes;

for each table in the permutation:

830 — emit the CREATE TABLE line with the table name;

840 — create a random permutation array of column name indexes;

for each column in the permutation:

850 — emit the column name (and any column data) for the CREATE TABLE statement;

860 — execute the SQL command, creating the table;

870 — INSERT the value R into the fixed-named table.

FIG. 8

SELECT FROM License WHERE ... AND StartDate <= current_date AND current_date <= EndDate

S = AES(data=obfuscated_table_name, key=R), or
S = hash(obfuscated_table_name + R)

FIG. 12A

S = AES(data= obfuscated_column_name, key=R), or
S = hash(obfuscated_column_name + R).

FIG. 12B

Sj = AES(data= obfuscated_column_name XOR j, key=R), or
Sj = hash(obfuscated_column_name + R + j).

FIG. 12C $x[0] = \text{ASCII}[y0^*],$
$x[1] = \text{ASCII}[[y0^* + 1 + y1^*],$
$x[2] = \text{ASCII}[y0^* + 1 + y1^* + 1 + y2^*],$
...
$x[9] = \text{ASCII}[y0^* + 1 + y1^* + 1 + y2^* \ldots + 1 + y9^*]$

FIG. 13

DATABASE OBFUSCATION SYSTEM AND METHOD

BACKGROUND

Software copy protection is always a race between software protection vendors, their customers (i.e., Independent Software Vendors (ISVs) that utilize the software copy protection to protect their software from unauthorized copying), and software crackers who circumvent the copy protection in the computer software. Typically, when a new copy protection method comes to market (whether a radical new method or an improvement of an existing protection method), software crackers try to break it so they can sell the cracked software at a price less than the price the ISV is charging for it.

Developers of software copy protection want to make cracking as difficult and frustrating for crackers as possible. One important goal is to avoid the possibility of a cracker finding a "generic crack" whereby, once a protection is analyzed and cracked, any software using that protection can easily be cracked. This is especially important for software security vendors, whose products are used by many ISVs. The existence of a generic crack would adversely affect all of their customers (the ISVs). In contrast, if each protected application has to be cracked individually, crackers need to spend much more time and energy on each effort to crack each application, resulting in only a few protected applications being cracked during a given time period.

A software security solution can use a database, such as a structured query language (SQL) database, to store and manage license information for copy protected application software. The license information may itself be protected, such as by encrypting, when it is stored in the database. However, to make it more difficult to analyze and crack the security solution, it is desirable to make the database more difficult for would-be crackers to understand what data is stored in the database, how it is stored, and how to manipulate the records of the database. Furthermore, it is desirable to make each license database instance unique, different from all of the others. Then, if a cracker analyses one license database, that knowledge cannot be directly applied to another database instance. For example, if a database schema included labels for tables such as "License," "License Attribute," etc., and the license, records contained fields (i.e., table column names) like "vendor," "serial number," "license feature," and the like, then a cracker could simply read the database with database browser programs and immediately see what's in it. That information could then be used in an attempt to crack the security solution. Thus, it is desirable to secure not only the data stored in a database, but to secure the database schema as well.

One solution to provide database security is to use encryption to encrypt data stored in the database. Such encryption is applied widely, and in many places it is actually mandated by law, such as the Health Insurance Portability and Accountability Act (HIPAA), or by a standard, such as the Payment Card Industry Data Security Standard (PCI DSS). In those cases, the encryption protects the data (e.g., patient name, credit card number, and the like) but does not protect the database schema (table and column names). The security threat that is protected by such a security solution is an unauthorized user stealing data from the database.

In contrast, the threat model in the case of software licensing is different. In this case, the adversary of the ISV who owns the software is the end user who would like to make and sell unauthorized copies of the software. In this case, the user has control over the database because it is used on the user's computer, such as a server. Because of this, simple data encryption won't help prevent unauthorized copying of the software, because the encryption key is embedded in the software and is accessible to the user because the software is under the control of the user. Adding an expensive hardware crypto module is not helpful for the same reason, i.e., because the end user controls that hardware as well, and would still be able to access the whole database for decoding simply by using the module.

In addition to using encryption, various methods of obscuring, or obfuscating, software operation or content are used by software vendors to protect their software. To make it more difficult for such crackers to analyze software, some software protection products employ various obfuscation methods (to hide what they are doing), and may also employ anti-debugging methods as well. For a software application that includes database functionality, it is desirable to obfuscate the database.

SUMMARY

Embodiments of the herein described systems and methods provide for obfuscating a database's schema while preserving its functionality, including modifying the original table names, column names, table order, column order, and/or data character set such that the standard order of the original characters is maintained.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the disclosed embodiments. Some figures show exemplary implementations of certain functionality in program pseudocode, such as pseudocode using C language syntax, but it is appreciated that any other programming language can also be used to achieve the same results. In the drawings:

FIGS. 5A and 5B are pseudocode for use in implementing an exemplary system in accordance with herein described systems and methods.

FIG. 6 is a list of options for use in implementing exemplary systems in accordance with herein described systems and methods.

FIGS. 7A, 7B, and 7C are pseudocode for use in implementing an exemplary system in accordance with herein described systems and methods.

FIG. 8 is pseudocode for use in implementing an exemplary system in accordance with herein described systems and methods.

FIG. 10 is pseudocode for use in using an exemplary system in accordance with herein described systems and methods.

FIG. 11 is a list of substitutions for use in implementing an exemplary system in accordance with herein described systems and methods.

FIGS. 12A, 12B, and 12C are pseudocode for use in implementing an exemplary system in accordance with herein described systems and methods.

FIG. 13 is pseudocode for use in implementing an exemplary system in accordance with herein described systems and methods.

DETAILED DESCRIPTION

As used hereinafter, the term "database obfuscation" indicates altering an instance of a database such that its structure is concealed while its functionality is maintained. The term "database schema" is used herein to indicate a description of the structure of a database, including the names of its tables, the relationships between the tables, the names of the columns of each table, and the data type and other attributes of the data stored in each column. In embodiments, the database schema can also include the order of characters in the character set used for storing data in the database.

In exemplary embodiments, one or more of the following general features can be implemented to obfuscate the database schema of each instance of a database, and/or the data stored in each instance of the database, for example, a license database containing information of software licenses. Unique meaningless table names can be used in each database instance. Unique meaningless column names can be used in one or more tables of each database instance. The tables, and/or columns within tables, can be reordered in the database schema of each database instance. For example, what is column 5 in table 3 in one database instance might be column 10 of table 6 in another database instance. Furthermore, the record data itself can be encoded uniquely in each database instance. Referential integrity is preserved, such as between tables of a relational database (i.e., the use of primary and foreign keys to relate the tables of a relational database). Furthermore, the ordering of the data of one or more data types is preserved, such as the ordering of numeric and date/time data, so that searches using comparative operators, such as less than/greater than operators, will yield the same results as in an unobfuscated database.

Figure 1:
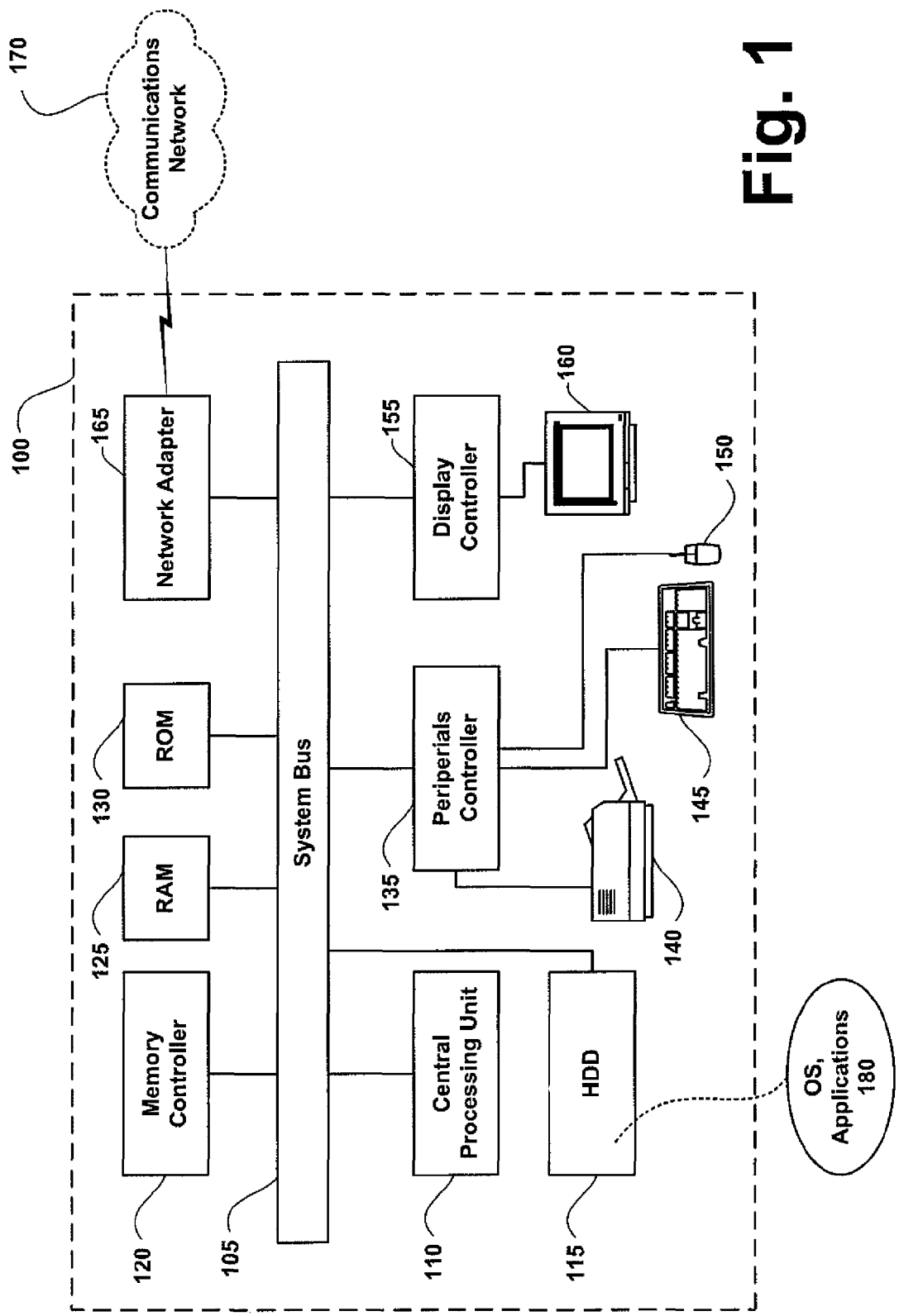
FIG. 1 is a block diagram of an exemplary computing system for use in accordance with herein described systems and methods.

FIG. 1 depicts an exemplary computing system 100 for use with embodiments of the herein described system and methods. Computing system 100 is capable of executing software, such as an operating system (OS) and a variety of computing applications 180. The operation of exemplary computing system 100 is controlled primarily by computer readable instructions, such as instructions stored in a computer readable storage medium, such as hard disk drive (HDD) 115, optical disk (not shown), solid state drive (not shown), or the like. Such instructions may be executed within central processing unit (CPU) 110 to cause computing system 100 to do work. In many known computer servers, workstations, and personal computers, CPU 110 is implemented on a micro-electronic chip called an integrated circuit.

It is appreciated that although the exemplary computing system 100 is shown to comprise a single CPU 110 that such description is merely illustrative as computing system 100 may comprise a plurality of CPUs 110. Additionally, computing system 100 may exploit the resources of remote CPUs (not shown) through communications network 170 or some other data communications means (not shown).

In operation, CPU 110 fetches, decodes, and executes instructions from a computer readable storage medium such as HDD 115. Such instructions can be included in software such as an operating system (OS), executable programs, and the like. Information, such as computer instructions and other computer readable data, is transferred between components of computer system 100 via the computer's main data-transfer path. The main data-transfer path may use a system bus architecture 105, although other computer architectures (not shown) can be used, such as architectures using serializers and deserializers (serdes) to communicate data between devices over serial communication paths. System bus 105 can include data lines for sending data, address lines for sending addresses, and control lines for sending interrupts and for operating the system bus. Some busses provide bus arbitration that regulates access to the bus by extension cards, controllers, and CPU 110. Devices that attach to the busses and arbitrate access to the bus are called bus masters. Bus master support also allows multiprocessor configurations of the busses to be created by the addition of bus master adapters containing a processor and its support chips.

Memory devices coupled to system bus 105 include random access memory (RAM) 125 and read only memory (ROM) 130. Such memories include circuitry that allows information to be stored and retrieved. ROMs 130 generally contain stored data that cannot be modified. Data stored in RAM 125 can be read or changed by CPU 110 or other hardware devices. Access to RAM 125 and/or ROM 130 may be controlled by memory controller 120. Memory controller 120 may provide an address translation function that translates virtual addresses into physical addresses as instructions are executed. Memory controller 120 may also provide a memory protection function that isolates processes within the system and isolates system processes from user processes. Thus, a program running in user mode can normally access only memory mapped by its own process virtual address space; it cannot access memory within another process's virtual address space unless memory sharing between the processes has been set up.

In addition, computing system 100 may contain peripheral controller 135 responsible for communicating instructions using a peripheral bus from CPU 110 to peripherals, such as printer 140, keyboard 145, and mouse 150. An example of a peripheral bus is a PCI (Peripheral Component Interconnect) bus.

Display 160, which is controlled by display controller 155, is used to display visual output generated by computing system 100. Such visual output may include text, graphics, animated graphics, and video. Display 160 may be implemented with a CRT-based video display, an LCD-based flat-panel display, gas plasma-based flat-panel display, touch-panel, or the like. Display controller 155 includes electronic components required to generate a video signal that is sent to display 160.

Further, computing system 100 may contain network adapter 165 which may be used to couple computing system 100 to an external communication network 170, which may include or provide access to the Internet. Communications network 170 may provide computer users with means of communicating and transferring software and information electronically. Additionally, communications network 170 may provide for distributed processing, which involves several computers and the sharing of workloads or cooperative efforts in performing a task. It is appreciated that the network connections shown are exemplary and other means of establishing communications links between the computers may be used.

It is appreciated that exemplary computer system 100 is merely illustrative of a computing environment in which the herein described systems and methods may operate and does not limit the implementation of the herein described systems and methods in computing environments having differing components and configurations, as the inventive concepts described herein may be implemented in various computing environments having various components and configurations.

Figure 2:
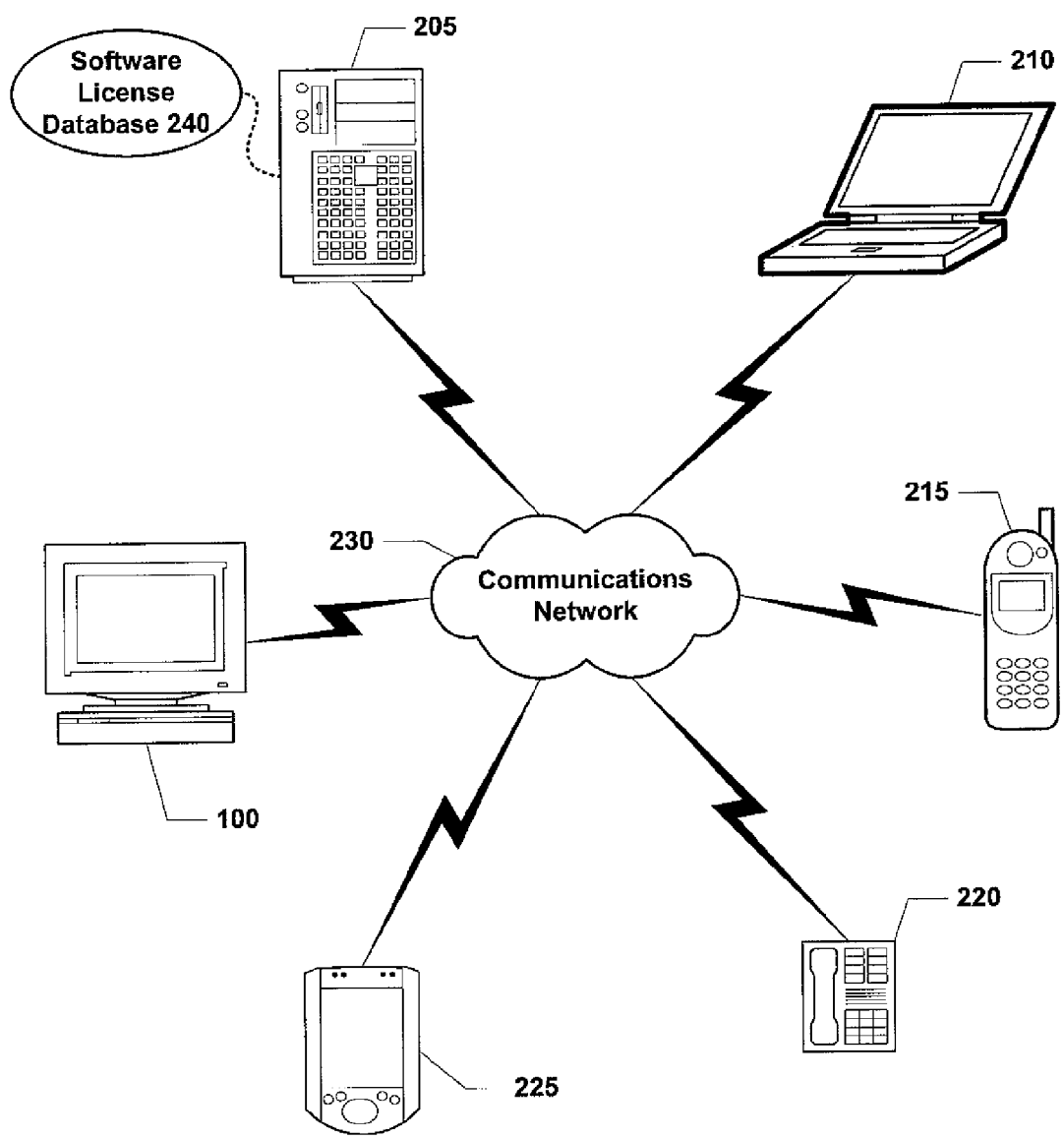
FIG. 2 is a block diagram showing an exemplary networked computer environment for use in accordance with herein described systems and methods.

As shown in FIG. 2, computing system 100 can be deployed as part of a computer network. In general, the above description for computing environments applies to both server computers and client computers deployed in a networked environment. FIG. 2 illustrates an exemplary illustrative networked computing environment 200, with a server in communication with client computing environments via a communications network, in which the herein described systems and methods may be used. As shown in FIG. 2, server 205 may be interconnected via a communications network 230 (which may include any of, or a combination of, a fixed-wire or wireless LAN, WAN, intranet, extranet, peer-to-peer network, virtual private network, the Internet, or other communications network) with a number of client computing environments such as laptop computer 210, mobile telephone 215, voice over internet protocol (VoIP) telephone 220, personal digital assistant 225, computer system 100, and/or other network enabled embedded devices/systems (not shown). Server 205 can comprise dedicated servers operable to process and communicate data to and from client computing environments 100, 210, 215, 220, 225, etc. via any of a number of known protocols, such as hypertext transfer protocol (HTTP), file transfer protocol (FTP), simple object access protocol (SOAP), wireless application protocol (WAP), or the like. Additionally, networked computing environment 200 can utilize various data security protocols such as secured socket layer (SSL), pretty good privacy (PGP), or the like. Each client computing environment 100, 210, 215, 220, 225, etc. can be equipped with an operating system operable to support one or more computing applications, such as a web browser (not shown), or other graphical user interface (not shown), or a mobile desktop environment (not shown) to interact with server 205.

In an exemplary implementation, an obfuscated database can be used to store software license information on server 205. However, such implementation is merely illustrative, and it is appreciated that other types of databases can be obfuscated for use in other types of applications. Preferably, an unobfuscated database can be replaced with a version of the same database that is obfuscated in accordance with the herein disclosed systems and methods, without adversely affecting the operation of the database. In other words, the database provides the same user interaction and the same results, regardless of whether or not the database is obfuscated.

Thus, in operation, a user (not shown) may interact with a computing application running on a client computing environment to obtain desired data and/or computing applications, such as data stored in a database. The data and/or computing applications may be stored on server computing environment 205 and communicated to cooperating users through client computing environments 100, 210, 215, 220, and 225, over the exemplary communications network 230. A participating user may request access to specific data and applications housed in whole or in part on server computing environment 205. Such data may be communicated between server 205 and client computing environments 100, 210, 215, 220, and 225 for processing and/or storage. Server 205 may host computing applications, processes and applets for the generation, authentication, encryption, obfuscation, and communication of data and applications and may cooperate with other server computing environments (not shown), third party service providers (not shown), network attached storage (NAS) and storage area networks (SAN) to realize application/data transactions.

In particular, server 205 can maintain software license data in a software license database 240. Such software license information can be used, for example, for software metering and monitoring. This can include tracking and maintaining software licenses, for example, to ensure that only the allowed number of licenses are in use. Monitoring of concurrent usage of software allows for real-time enforcement of license limits, and can detect unregistered or unlicensed software and prevent its execution, or limit execution of certain software to within certain hours. A license database can be used to meter licensed application usage according to specified policies, and to maintain a record of usage and attempted usage. An organization can also check out and check in licenses for mobile users, and can keep a record of all licenses in use. This can be used, for example, when limited license counts are available to avoid violating strict license controls. Software metering further provides a means to set and maintain a consistent set of standards across all levels of an organization. Thus, a software license database can be used to keep track of licensed software usage, to give details of software installed in a network environment, to track software usage details such as how often certain licensed software is used by a particular department, the peak times it's being used and/or the peak number of copies running concurrently, what add-ons are being utilized with it, and the like. Such information can be used, for example, to manage software licensing costs in an organization.

In an exemplary implementation, server 205 comprising a license database 240 containing software license information can communicate with computing environments 100, 210, 215, 220, 225 via network 230 to enable installation and/or operation of licensed software, to monitor usage of licensed software, and the like. Software license database 240 can be obfuscated to conceal its structure and/or operation, such as for protecting against creating and selling copies of the database. The obfuscation can be accomplished without adversely affecting the operation of the database. In an embodiment, the database can be obfuscated after it is installed on server 205. In another embodiment, the database can be installed in an already obfuscated condition. In yet another embodiment, the database can be obfuscated during the process of installing it in server 205.

Figure 3:
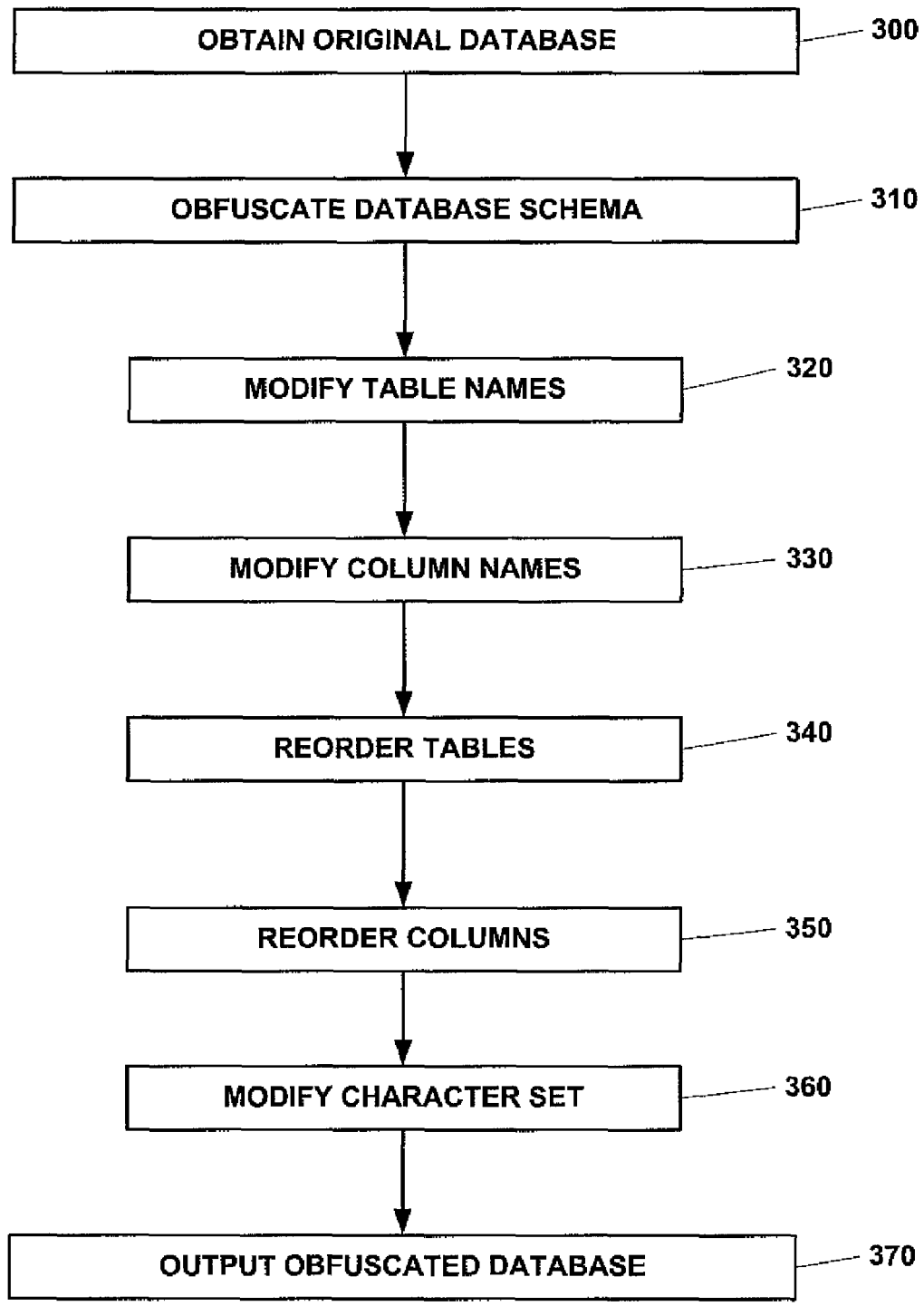
FIG. 3 is a flowchart diagram showing processing performed by an exemplary system in accordance herein described systems and methods.

FIG. 3 is a flow chart showing processing performed in obfuscating a database. The process begins at block 300 by obtaining an original database. The schema of the database is obfuscated 310, including one or more steps 320 through 360, which can be accomplished in any order. Obfuscating the database 310 can include one or more of: modifying one or more of the names of the tables of the database 320; modifying one or more of the columns of one or more of the tables 330; reordering tables 340; reordering columns of one or more of the tables 350; and modifying the character set used in one or more data types of the database 360 such that the standard order of the characters used in that data type is maintained. The standard order is maintained so that operations dependent on the standard order of the data is preserved, such as less than/greater than operators and the like. The obfuscated database is then output 370.

Figure 4:
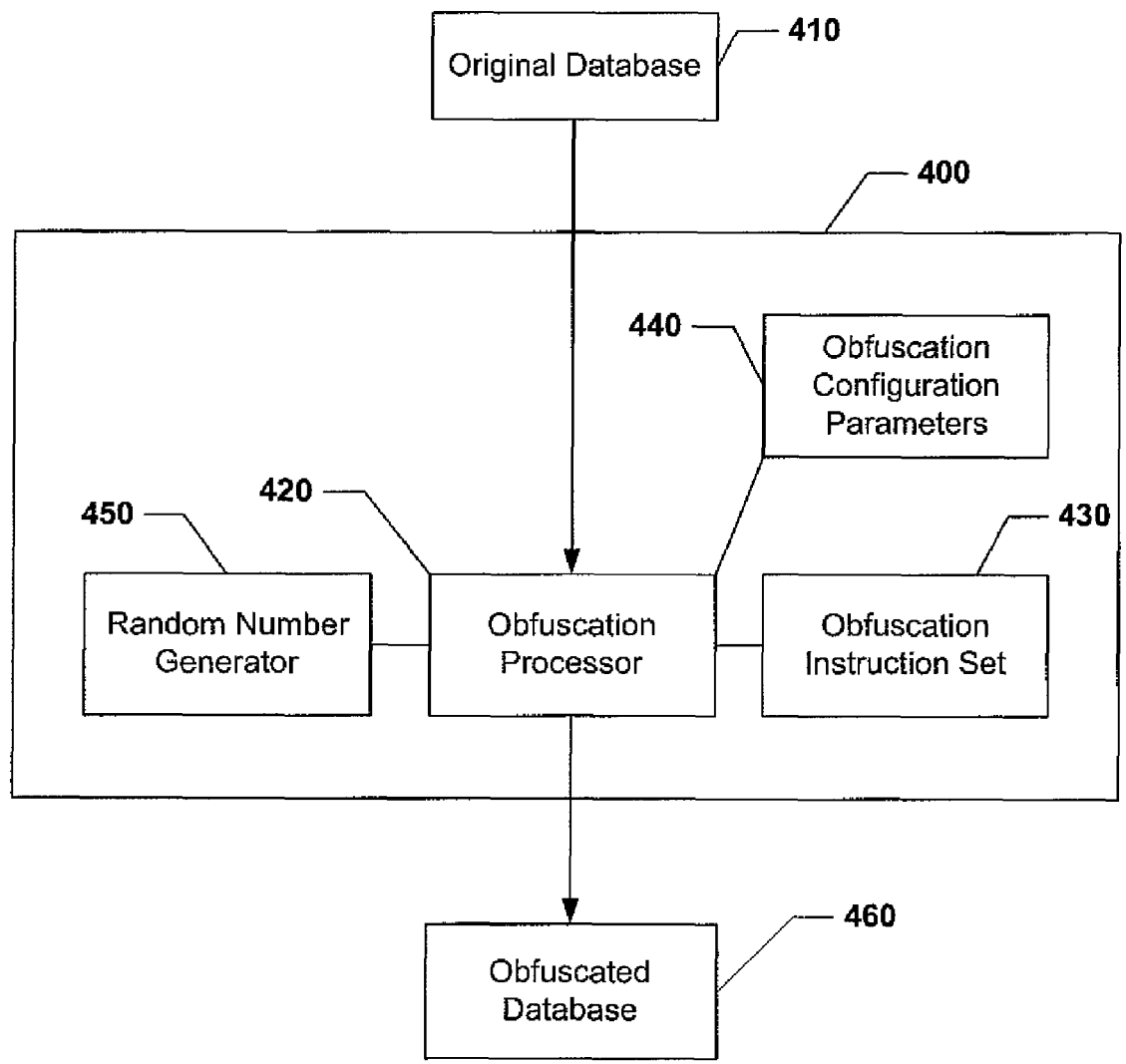
FIG. 4 is a block diagram showing cooperating exemplary components of an exemplary system in accordance herein described systems and methods.

FIG. 4 is a block diagram showing cooperating exemplary components of an exemplary database obfuscating system 400 for generating an obfuscated database. System 400 includes an obfuscation processor 420 which obtains an original database 410, obfuscates the original database, and outputs the obfuscated database 460. Obfuscation processor 420 is coupled to obfuscation instruction set 430, typically comprising computer code stored in a computer readable storage device. Obfuscation processor 420 is also coupled to obfuscation configuration parameters 440, which may also comprise computer code stored in a computer readable storage device. Configuration parameters 440 may be selected by a user, or may be determined automatically or in conjunction with user selected parameters, for example, based on characteristics of the original database, and/or desired characteristics of the obfuscated database, such as may be desirable for a particular implementation. Obfuscation processor 420 is also coupled to random number generator 450. Obfuscation processor 420 processes original database 410 in accordance with obfuscation instruction set 430 and obfuscation configuration parameters 440, using a random number generated by random number generator 450, and outputs the obfuscated database 460.

FIG. 5A illustrates pseudocode (500) of an exemplary implementation that generates unique and meaningless table names in each installed instance of a database. Table names and column names are #defined in header files 504, 506, but are #defined differently for a debug mode 510, such as for use by the software protection vendor for internal development, and for a release mode 515, such as for the product shipped to customers. If in debug mode, the table and column names are not obfuscated 504, but if not in debug mode, then the table and column names are obfuscated 506. In the obfuscated table and column names, the "rrrrrrrrrr"s are random hexadecimal characters for each table or column definition line. Although ten "r"s are shown, any number of random hexadecimal or other random characters can also be used. The code then builds a database description struct 520. Startup code sets the actual pointers, for example, using code as in FIG. 5B. Additional code (not shown) then uses the table names and column names through these static structures. In embodiments, other information may also be stored in the table or column struct. For example, a struct can determine a data type for each column, a maximum length of the data allowed in each column, and the like.

To generate unique table and column names, preferably a random value R is generated by a random number generator and stored. The random value R can be stored, for example, in a fixed-named table, i.e, a table whose name is not obfuscated. In an alternative embodiment, a unique but constant value C can be used that is not random, such as a computer fingerprint value that can be obtained from the computer on which the database is installed. For example, a characteristic of the computer, such as a disk serial number, a network card address, or the like, can be used to generate unique and meaningless table and column names. Using random numbers R may be preferable, at least because use of random numbers allows multiple unique databases to be present on the same computer. Furthermore, if a hardware component is used to generate obfuscated names, changing the hardware component, such as by replacing the component, may invalidate the database.

In an exemplary embodiment, obfuscating the database schema involves deriving an "obfuscated name" for one or more tables, and one or more column names of columns in tables, using the R or C value and the table's or column's original name or identifying number. There are many ways to derive the obfuscated names. FIG. 6 provides a list of exemplary obfuscating functions that can be used, although it is appreciated that other or additional functions can be used. In some functions listed in FIG. 6, the Advanced Encryption Standard (AES) is used. AES is a block cipher that has been adopted as an encryption standard by the U.S. government and is in use worldwide. As an alternative, Data Encryption Standard (DES) can also be used.

In an embodiment, an additional obfuscation can be achieved by varying the length of the generated names. For example, if sixteen character names are generated, the last 0-3 characters can be truncated, such as by using a determined reduction length (first_char & 3).

After obfuscated names are generated, they can be converted to ASCII strings, for example, using a hexadecimal representation. The protection code can then change the name pointers in the structs in accordance with the obfuscated names.

In an embodiment, if a random number R is used it can be stored in a specific column of a specific table of the database. In that case, that table's name should not be obfuscated, nor should the name of the column containing the value R. The R value can be retrieved when the database is opened so the obfuscated table and column names can be regenerated. In an embodiment, a unique table can be used to store the value R, such as a table having only one column. Then, database startup code can enumerate the database schema and identify the only table having only one column, then use that table and column name retrieved from the schema itself to retrieve R.

To further obfuscate the database schema, elements of the schema can be reordered. This can be helpful because, after the tables and columns are renamed, a cracker may still determine what a certain column of a certain table contains, and using that information may determine a column or table name from the stored schema. To make it harder to identify table and column names, the schema definition can be randomly reordered.

In an exemplary embodiment, when a database is created with multiple CREATE TABLE SQL commands, a DbTables struct array is processed. Ordinarily, code such as the code of FIG. 7A is used in an outer loop to loop through the tables, and code such as the code of FIG. 7B is used in an inner loop to loop through each table's columns. In an embodiment, that code can be replaced by code that creates a random permutation of a series of numbers 0, 1, ..., for example, using code such as:
"(NumOfLicenseTables−1) as i1, i2, ... iN."
The permuted numbers can be put into an array, using code such as:
"TablePermute[NumOfLicenseTables]."
The outer loop would then be as in FIG. 7C. Similarly, the column indexes in each table's struct can be permuted, and the inner loop can use the permuted order of the columns.

FIG. 8 shows a diagram of an exemplary implementation for creating a database instance, for example, for installation on a server such as server 205. FIG. 8 uses pseudocode in which indentation of the statements indicate a programming loop. Actual computer code can be written in any suitable programming language.

In FIG. 8, a random number R is generated 800. Except for one table that remains fixed, obfuscated table and column names are derived from R and the original names 810, for example, as hereinbefore described. The fixed name table can be used to store R, as will be described. A random permutation array of the table indexes is created 820. Then, for each table in the permutation, a CREATE TABLE line is emitted with the obfuscated table name 830. A random permutation array of column name indexes is created 840. Next, for each column in the permutation, the obfuscated column name and any associated column data is emitted for the CREATE TABLE statement 850. The SQL command is executed, creating the table 860. Finally, the value R is inserted into the fixed-named table 870, for use in regenerating the obfuscated table names and/or column names.

Figure 9:
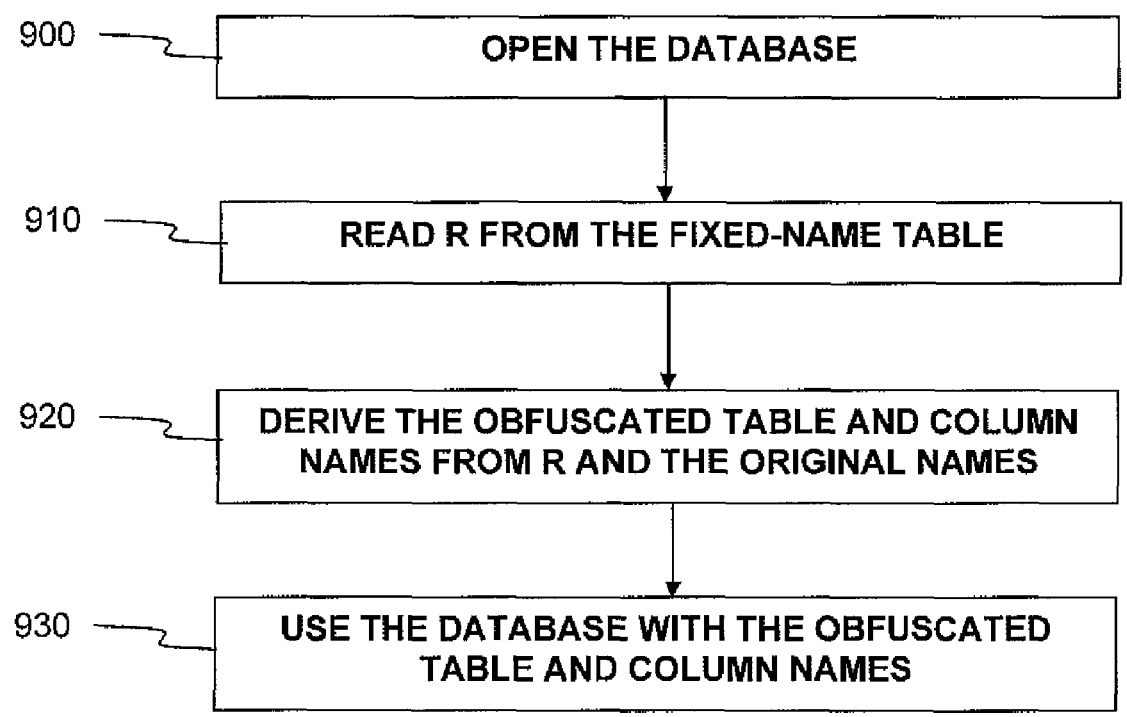
FIG. 9 is a flowchart diagram showing processing performed by an exemplary system in accordance with herein described systems and methods.

FIG. 9 is a flow diagram showing exemplary steps for using a database obfuscated using the procedure described above. The obfuscated database is opened 900, and the value R is read from the fixed-name table 910. The fixed-name table can be identified, for example, by enumerating the database and identifying the only table having a single column. The obfuscated table and column names are derived using the value R and the original names 920. The database is then used with the obfuscated table and column names 930.

After a database schema is obfuscated using random-looking table and column names and reordering elements of the schema, the schemas of two different database instances will look totally different, and a cracker will experience increased difficulty in understanding which column of which table contains what.

In addition to obfuscating the database schema by renaming and rearranging the tables and columns as described above, it is also desirable to obfuscate the actual data in the various records. The data obfuscation should be accomplished such that the standard order of the data will not be affected, so operators dependent upon the standard order will yield the same results for both obfuscated and unobfuscated data. For example, the results of comparison operators such as less than/greater operators are dependent on the standard order of data. An example of a statement using such operators that should yield the same result using original data or obfuscated data is shown in FIG. 10. Obfuscating data is not the same as simply encrypting the data, because regular encryption does not provide this capability. Although regular encryption is useful when comparing data for exact matches (RecordValue==expected_value), it cannot be used when less than and greater than comparison is needed, for example.

As least four different data types can be separately considered with regard to data obfuscation, including integer or other numeric data, date and date+time data, text data, and binary large object (blob) data. A blob comprises binary data stored as a single entity, such as an image, audio, video, or other multimedia object and the like.

In addition, database tables typically have primary and foreign keys which help organize the database, for example, in defining relationships between tables of a relational database management system (RDBMS). Keys also allow refactoring of a database, for example, for normalizing the database into a standard form, such as a first, second, or third normal form. Random values, for example, in hexadecimal form, can be assigned to keys to make them appear meaningless to crackers.

Regarding integer or other numeric data, such data comprises decimal strings consisting of the characters 0 . . . 9. To allow comparison on obfuscated data, which are text, integer values can be represented as fixed length decimal strings padded with leading zeroes. For example, 10-digit fixed length values can be used. It is appreciated that other arrangements can be used for obfuscating integers, such as a fixed length other than 10 digits, or padding using a character other than zero.

Regarding date/time data, date data can be represented, for example, in yyyymmdd and date+time in yyyymmddhhmmss decimal string format, which also consist of characters 0 . . . 9, and can be obfuscated using the same type of integer substitution disclosed previously. It is appreciated that other arrangements can be used for obfuscating date and date+time data, such as different ordering of the day, month, year, hour, minutes, and seconds, or the like.

Regarding text data, text data uses a limited range of character encoding. For example, ASCII character encoding is between 0x20 and 0x7F. Text data can be obfuscated by using a different range. However, care must be used to select a range that does not yield results subject to an attack. For example, structured query language (SQL) injection is a technique that exploits security vulnerabilities that can arise from certain substitutions. In order to avoid SQL injection attacks, certain characters or sequences of characters should not be allowed in text fields, and obfuscated data can be generated such that those characters and character sequences are not used. SQL attacks can also be avoided by obfuscating text data by converting it to an alternative representation, such as Base64 representation.

Blob data is binary and consists of an arbitrary byte array. Many database systems allow blob data type. Blob data can be obfuscated, for example, by converting binary data to Base64 (text) representation.

Preferably, the operation of comparison operators such as less than and greater than operators, is maintained after data is obfuscated. In particular, comparison on numeric and date/date+time data should be preserved, so a form of transformation should be used which preserves the standard order of data after it is obfuscated. For example, a substitution function f( ) as in FIG. 11 can be used, wherein $x0<x1<x2<x3<x4<x5<x6<x7<x8<x9$ for the output characters $x0 \ldots x9$ holds true. Almost all ASCII characters can be used for such a substitution, i.e., from 0x21='§' to 0x7E='~', but leaving out those that can be abused for SQL injection attacks, as described previously. Thus, any suitable array of 10 ASCII or other appropriate characters whose values are monotonically increasing can be used to obfuscate integer and date/date+time data. As an example, for $x[10]=\{x0, x1, x2, \ldots x9\}$; any function $f(c)=x[c-'0']$ can be used as a substitution function, although it is appreciated that other functions can be used.

Since it is desirable to have a unique mapping function for each database instance, values xi can be generated which are random-looking but use some known seed, so each time the database is opened the x[10] array of obfuscation characters can be regenerated. The random number R previously used and stored in a specific table of the data base can be used for this purpose. Using R, in one embodiment, a single x[10] array can be generated for use in the whole database. In another embodiment, a separate array can be generated for each table. In a further embodiment, a separate array can be generated each record field decimal string obfuscation array. Furthermore, one array can be used for all characters in the decimal string, or alternatively, a two-dimensional array can be used, wherein each position (index) in the decimal string has its own independent obfuscation array. In an implementation, 32-bit integers can be stored, and the integers can be represented using 10-digit decimal numbers. Date data can use an 8-character array, and date+time can use a 14-character decimal array. Thus, the maximum decimal string length needed to represent integer and date/time data can be provided using an x[14][10] two-dimensional array. In an implementation, an original decimal string such as $s=\{c0, c1, cN\}$ (decimal) characters can be represented using an obfuscated string such as $obf(s)=\{x[0][c0-'0'], x[1][c1-'0'], \ldots x[N][cN-'0']\}$.

To determine appropriate monotonically ordered characters for use in obfuscating data by character substitution, a seed value can be generated. In various embodiments, the seed value can be global for the database, or per table, or per column, or per-position-in-column. For example, a global seed value S can simply be random number R or any appropriate transformation on R. For a seed value S generated for each table, S can be determined, for example, as shown in FIG. 12A. FIG. 12A shows exemplary pseudocode for two different methods for generating a unique value S for each table, although it is appreciated that other methods may be used. For a seed value S generated for each column, S can be determined, for example, as shown in FIG. 12B, although other methods may be used. For the most fine-grained 14×10 array, an array of seeds can be generated, for example, as shown in FIG. 12C. It is appreciated that the functions given in FIGS. 12 are merely illustrative, and other suitable functions can also be used.

Once a seed S is determined, an ordered set of characters, such as a subset of the ASCII character set, can be determined for the data obfuscation. In an embodiment, values between 0 and 7 are first determined. For example, $y0$=AES(S, R)'s first byte, $y1$ its second byte, ... $y9$ its 10th byte. Alternatively $yi$ can be the ith byte of hash(S), or some other transformation of S. Bytes are values between 0 and 255, but if we AND them with 0x07, then each $yi^*$=$yi$ & 7 will be between 0 and 7.

Next, values can be assigned as shown in FIG. 13, basically picking the next $yi^*$th character from the ASCII table. Since the ASCII table is ordered, and later and later characters are picked from it, this procedure ensures that the resulting $x[10]$ array is also ordered: $x[k]<x[n]$ if and only if $k<n$.

If comparison operators, such as less than/greater than comparison operators, are not needed on a particular data type for an application, any conventional encryption can be used on fields of those types. For example, comparison operators are typically not used on text and blob data, so data of those data types can be encrypted. Alternatively, data of such types can be obfuscated using a Base64 representation of the data. In an embodiment, obfuscation can be achieved by generating a permutation of the Base64 character set, and using the permutation instead of the "standard" Base64 encoding set to encode/decode text and blob data. Such permutation can be generated, for example, based on the random value R and the already-obfuscated table/column names.

Various modifications and variations can be made in the disclosed systems and methods without departing from the spirit or scope of the invention. Thus, it is intended that the present invention cover such modifications and variations provided they come within the scope of the appended claims and their equivalents.

What is claimed is:

1. A method of obfuscating the schema of a database while preserving the functionality of the database, comprising:
providing an original database comprising at least one table having an original table name, each said table comprising at least one column having an original column name, the database storing data using original characters of an original character set in which the original characters have a standard order;
obfuscating the database schema by at least one of:
modifying every instance of at least one said original table name as a respective obfuscated table name;
modifying every instance of at least one said original column name as a respective obfuscated column name;
modifying the ordering of at least two said tables of the database;
modifying the ordering of at least two said columns of at least one said table; and
modifying every instance of at least one character of the data of the database as a respective obfuscated character of an obfuscated character set, such that the standard order of the original characters in the original character set is the same as the order of the corresponding obfuscated characters in the obfuscated character set; and
outputting the obfuscated database.

2. The method of claim 1 further comprising:
obtaining an obfuscating number R; and
using R to obfuscate the database.

3. The method of claim 2, wherein the number R is a random number.

4. The method of claim 2, wherein the obfuscating number R is stored in the obfuscated database in a column with an original column name of a table with an original table name.

5. The method of claim 2, wherein said obfuscated table name is generated using R and the original table name.

6. The method of claim 5, wherein said obfuscated table name is generated by one of:
hashing together R and the original table name; and
encrypting the original table name with R as an encryption key.

7. The method of claim 2, wherein said obfuscated column name is generated using R and the original column name.

8. The method of claim 7, wherein said obfuscated column name is generated by one of:
hashing together R and the original column name; and
encrypting the original column name with R as an encryption key.

9. The method of claim 1, further comprising truncating at least one of said obfuscated table names as respective randomized table names.

10. The method of claim 1, further comprising truncating at least one of said obfuscated column names as respective randomized column names.

11. The method of claim 1, further comprising reordering the tables in the database.

12. The method of claim 1, further comprising reordering the columns in at least one of said tables.

13. The method of claim 1, further comprising obfuscating the data of at least one of decimal string fields and date/time fields of the database such that the standard order of the original data is preserved in the corresponding obfuscated data.

14. A computer readable storage medium storing computer readable instructions which when read by a computer cause the computer to perform a method obfuscating the schema of a database while preserving the functionality of the database, the method comprising:
obfuscating the database schema of a database comprising at least one table having an original table name, each said table comprising at least one column having an original column name, the database storing data using original characters of an original character set in which the original characters have a standard order, wherein the obfuscating includes at least one of:
modifying every instance of at least one said original table name as a respective obfuscated table name;
modifying every instance of at least one said original column name as a respective obfuscated column name;
modifying the ordering of at least two said tables of the database;

modifying the ordering of at least two said columns of at least one said table; and modifying every instance of at least one character of the data of the database as a respective obfuscated character of an obfuscated character set, such that the standard order of the original characters in the original character set is the same as the order of the corresponding obfuscated characters in the obfuscated character set.

15. A system for use in obfuscating the schema of a database while preserving the functionality of the database, the system comprising:

an input for receiving an original database;

an obfuscation instruction set for use in generating an obfuscated database;

obfuscation configuration parameters for determining options of the obfuscation instruction set to be used in generating the obfuscated database;

a random number generator;

an obfuscation processor coupled to the input, the random number generator, the instruction set, and the configuration parameters, for generating an obfuscated database using the original database and the random number in accordance with the instruction set and configuration parameters; and an output coupled to the obfuscation processor for outputting the obfuscated database.

16. The system of claim 15 further comprising a data storage for storing at least one of the original database, the generated random number, the obfuscation instruction set, the obfuscation configuration parameters, and the obfuscated database.

17. The system of claim 15, wherein the obfuscation processor is operative to obtain an obfuscating number R, and use R to obfuscate the database.

18. The system of claim 17, wherein the number R is a random number from the random number generator.

19. The system of claim 17, wherein the obfuscation processor is operative to store the obfuscating number R in the obfuscated database in a column with an original column name of a table with an original table name.

20. The system of claim 17, wherein the obfuscation processor is operative to generate said obfuscated table name using R and the original table name.

21. The system of claim 20, wherein the obfuscation processor is operative to generate said obfuscated table name by one of:

hashing together R and the original table name; and encrypting the original table name with R as an encryption key.

22. The system of claim 17, wherein the obfuscation processor is operative to generate said obfuscated column name using R and the original column name.

23. The system of claim 22, wherein the obfuscation processor is operative to generate said obfuscated column name by one of:

hashing together R and the original column name; and encrypting the original column name with R as an encryption key.

24. The system of claim 15, wherein the obfuscation processor is operative to truncate at least one of said obfuscated table names as respective randomized table names.

25. The system of claim 15, wherein the obfuscation processor is operative to truncate at least one of said obfuscated column names as respective randomized column names.

26. The system of claim 15, wherein the obfuscation processor is operative to reorder the tables in the database.

27. The system of claim 15, wherein the obfuscation processor is operative to reorder the columns in at least one of said tables.

28. The system of claim 15, wherein the obfuscation processor is operative to obfuscate the data of at least one of decimal string fields and date/time fields of the database such that the standard order of the original data is preserved in the corresponding obfuscated data.

* * * * *